(12) United States Patent  (10) Patent No.: US 8,896,908 B2
Shuto et al.  (45) Date of Patent: Nov. 25, 2014

(54) ELECTROPHORETIC DEVICE, METHOD OF MANUFACTURING THE SAME, AND DISPLAY UNIT

(71) Applicant: Sony Corporation, Tokyo (JP)

(72) Inventors: Aya Shuto, Kanagawa (JP); Hidehiko Takanashi, Kanagawa (JP); Ken Kobayashi, Kanagawa (JP); Yuriko Kaino, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/899,607

(22) Filed: May 22, 2013

(65) Prior Publication Data

US 2013/0321896 A1 Dec. 5, 2013

(30) Foreign Application Priority Data

Jun. 5, 2012 (JP) ................. 2012-127981

(51) Int. Cl.

| | |
|---|---|
| G02B 26/00 | (2006.01) |
| G02F 1/133 | (2006.01) |
| G09G 3/34 | (2006.01) |
| G03G 13/00 | (2006.01) |
| G02B 26/02 | (2006.01) |
| G02F 1/167 | (2006.01) |

(52) U.S. Cl.
CPC ................. *G02F 1/167* (2013.01); *G02B 26/00* (2013.01); *G02B 26/026* (2013.01)

USPC ................. 359/296; 349/33; 345/107; 430/31

(58) Field of Classification Search
CPC ........... G02B 26/00; G02F 1/061; G02F 1/03; G02F 1/133
USPC ......... 359/296, 245, 253, 254, 290, 291, 298; 349/33; 345/49, 105, 107; 430/31–32
See application file for complete search history.

(56) References Cited

U.S. PATENT DOCUMENTS

| | | | |
|---|---|---|---|
| 2011/0310465 A1* | 12/2011 | Takanashi et al. | 359/296 |
| 2012/0099182 A1* | 4/2012 | Ogawa | 359/296 |
| 2012/0105941 A1* | 5/2012 | Ogawa | 359/296 |

FOREIGN PATENT DOCUMENTS

| | | |
|---|---|---|
| JP | 50-015115 | 6/1975 |
| JP | 50-015120 | 6/1975 |
| JP | 2002-244163 A | 8/2002 |
| JP | 2005-107146 A | 4/2005 |
| JP | 2005-128143 A | 5/2005 |
| JP | 4188091 B2 | 9/2008 |

* cited by examiner

*Primary Examiner* — Dawayne A Pinkney
(74) *Attorney, Agent, or Firm* — Sony Corporation

(57) ABSTRACT

An electrophoretic device includes: in an insulating liquid, a plurality of electrophoretic particles; and a porous layer formed of a fibrous structure, the fibrous structure including a plurality of non-migrating particles. The fibrous structure is configured of superposed fibers extending in an identical direction or different directions, and includes a cross-linking section in which the fibers are linked to each other in part or all of contact points between the fibers.

18 Claims, 4 Drawing Sheets

ELECTROPHORETIC DEVICE, METHOD OF MANUFACTURING THE SAME, AND DISPLAY UNIT

BACKGROUND

The present disclosure relates to an electrophoretic device including a plurality of electrophoretic particles in an insulating liquid, to a method of manufacturing the same, and to a display unit.

In recent years, as mobile devices represented by mobile phones and personal digital assistants become widely used, display units (displays) having low power consumption and high image quality have been increasingly demanded. In particular, lately, in association with birth of delivery business of electronic books, personal digital assistants (electronic book terminals) for reading application having the purpose of reading textual information for a long time have attracted attention. Therefore, displays having display quality suitable for such an application have been desired.

As the display for reading application, for example, cholesteric liquid crystal displays, electrophoretic displays, electrochromic displays, twist ball displays, and the like have been proposed. In particular, reflective displays are preferable. One reason for this is that since the reflective displays perform bright display by utilizing reflection (scattering) of outside light as paper does, the reflective displays provide display quality close to that of paper. Further, in the reflective displays, a backlight is not necessitated, and therefore, power consumption is kept low.

A major candidate of the reflective displays is the electrophoretic display that generates contrast by utilizing an electrophoretic phenomenon, since power consumption is low and high-speed response is superior in the electrophoretic display. Therefore, various discussions have been made for display methods of the electrophoretic display.

Specifically, a method of dispersing two types of charged particles having different optical reflection characteristics in an insulating liquid, and moving the respective charged particles according to an electric field has been proposed (for example, see Japanese Examined Patent Application Publication No. S50-015115 and Japanese Patent No. 4188091). In this method, since the two types of charged particles have opposite polarities, a distribution state of the charged particles is changed according to the electric field.

Further, a method of arranging a porous layer in an insulating liquid and dispersing charged particles, and moving the charged particles through fine pores of the porous layer according to an electric field has been proposed (for example, see Japanese Unexamined Patent Application Publication No. 2005-107146, Japanese Examined Patent Application Publication No. S50-015120, Japanese Unexamined Patent Application Publication No. 2005-128143, and Japanese Unexamined Patent Application Publication No. 2002-244163). In this method, as the porous layer, a polymer film in which fine pores are formed by a boring process using a laser, a woven cloth made of synthesized fibers or the like, an open-cell porous polymer, or the like is used, for example.

SUMMARY

Although various display methods of the electrophoretic display have been proposed, the display quality thereof is not enough yet. In view of achieving, for example, color display, movie display, and the like in the future, it is necessary to further improve contrast and response speed.

It is desirable to provide an electrophoretic device capable of achieving high contrast and high-speed response, a method of manufacturing the same, and a display unit.

According to an embodiment of the present technology, there is provided an electrophoretic device including: in an insulating liquid, a plurality of electrophoretic particles; and a porous layer formed of a fibrous structure, the fibrous structure including a plurality of non-migrating particles. The fibrous structure is configured of superposed fibers extending in an identical direction or different directions, and includes a cross-linking section in which the fibers are linked to each other in part or all of contact points between the fibers.

According to an embodiment of the present technology, there is provided a method of manufacturing an electrophoretic device, the method including: forming a fibrous structure configured of superposed fibers that extend in an identical direction or different directions; and forming a porous layer by adding non-migrating particles to the fibrous structure and dispersing the non-migrating particles in the fibrous structure. A cross-linking section in which the fibers are linked to each other is formed in part or all of contact points between the fibers of the fibrous structure.

According to an embodiment of the present technology, there is provided a display unit provided with an electrophoretic device between a pair of bases, one or both of which are light transmissive, the pair of bases each being provided with an electrode, the electrophoretic device including: in an insulating liquid, a plurality of electrophoretic particles; and a porous layer formed of a fibrous structure, the fibrous structure including a plurality of non-migrating particles. The fibrous structure is configured of superposed fibers extending in an identical direction or different directions, and includes a cross-linking section in which the fibers are linked to each other in part or all of contact points between the fibers.

In the electrophoretic device, the method of manufacturing the same, and the display unit according to the embodiments of the present technology, the fibrous structure configuring the porous layer includes the predetermined cross-linking section in the contact point between the fibers, and thereby, light-scattering efficiency in the porous layer is improved while movement paths of the electrophoretic particles are secured.

According to the electrophoretic device, the method of manufacturing the same, and the display unit according to the embodiments of the present technology, the fibrous structure configuring the porous layer includes the predetermined cross-linking section in the contact point between the fibers, the light-scattering efficiency in the porous layer is improved while the movement paths of the electrophoretic particles are secured. Therefore, high contrast and high-speed response are achieved.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

An embodiment of the present technology will be described in detail below with reference to the drawings. The description will be given in the following order:
1. Embodiment
   1-1. Whole Configuration
   1-2. Method of Forming Porous Layer
2. Application Example
3. Examples

[1. Electrophoretic Device]

Figure 1:
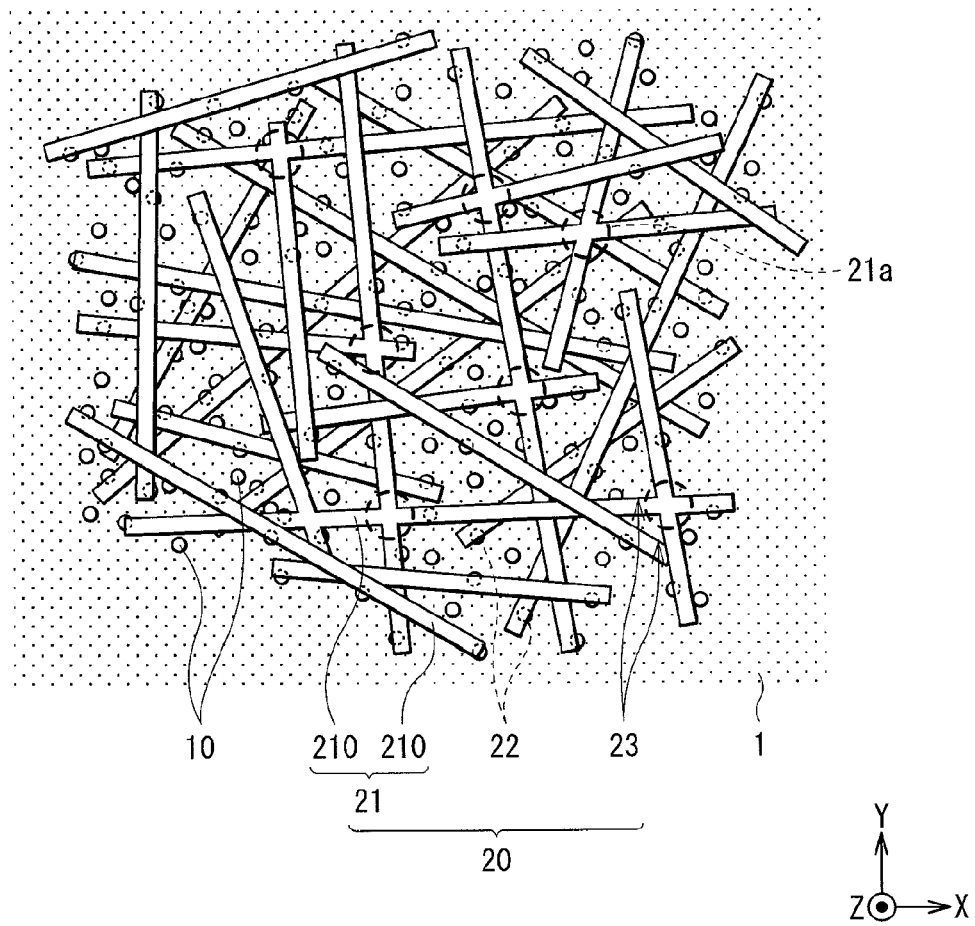
FIG. 1 is a plane view illustrating a configuration of an electrophoretic device according to an embodiment of the present technology.
Figure 2:
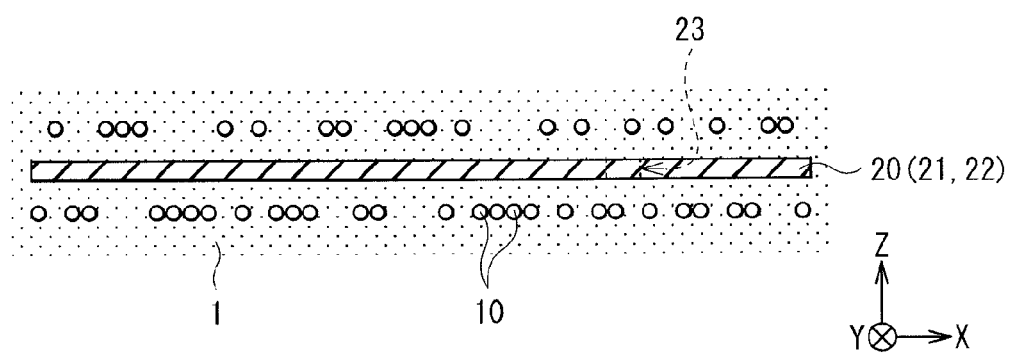
FIG. 2 is a cross-sectional view illustrating a configuration of the electrophoretic device.

FIG. 1 and FIG. 2 illustrate a plane configuration and a cross-sectional configuration of an electrophoretic device according to an embodiment of the present technology. The electrophoretic device generates contrast by utilizing an electrophoretic phenomenon, and is applied to various electronic units such as a display unit. The electrophoretic device includes a plurality of electrophoretic particles 10 having polarity and a porous layer 20 in an insulating liquid 1. In this embodiment, the porous layer 20 includes a fibrous structure 21 and non-migrating particles 22. The non-migrating particles 22 are dispersed in the fibrous structure 21 in a predetermined range.

1-1. Whole Configuration
[Insulating Liquid]

The insulating liquid 1 may be, for example, one or more of organic solvents, and may be specifically paraffin, isoparaffin, or the like. Viscosity and refractive index of the insulating liquid 1 are preferably small as much as possible. One reason for this is that, in this case, mobility (response speed) of the electrophoretic particles 10 is improved, and accordingly energy (power consumption) necessary to move the electrophoretic particles 10 is decreased. Another reason for this is that, since a difference between the refractive index of the insulating liquid 1 and refractive index of the porous layer 20 is increased, reflectance of the porous layer 20 is increased.

It is to be noted that the insulating liquid 1 may contain other various materials as necessary. Examples of the various materials include a colorant, a charge control agent, a dispersion stabilizer, a viscosity modifier, an interfacial active agent, and a resin.

[Electrophoretic Particles]

The electrophoretic particles 10 are charged particles dispersed in the insulating liquid 1, and are allowed to be moved through the porous layer 20 according to an electric field. The electrophoretic particles 10 may be, for example, one or more of particles (powder) formed of a material such as an organic pigment, an inorganic pigment, a dye, a carbon material, a metal material, a metal oxide, glass, and a polymer material (resin). Further, the electrophoretic particle 10 may be a crushed particle, a capsule particle, or the like of a resin solid content containing the foregoing particles, for example. Materials corresponding to the carbon material, the metal material, the metal oxide, the glass, or the polymer material are excluded from materials corresponding to the organic pigment, the inorganic pigment, or the dye.

Examples of the organic pigment include an azo pigment, a metal complex azo pigment, a poly-condensed azo pigment, a flavanthrone pigment, a benzimidazolone pigment, a phthalocyanine pigment, a quinacridone pigment, an anthraquinone pigment, a perylene pigment, a perinone pigment, an anthrapyridine pigment, a piranthrone pigment, a dioxazine pigment, a thioindigo pigment, an isoindolinone pigment, a quinophthalone pigment, and an indanthrene pigment. Examples of the inorganic pigment include zinc oxide, antimony trioxide, carbon black, iron black, titanium boride, colcothar, mapico yellow, minium, cadmium yellow, zinc sulfide, lithopone, barium sulfide, cadmium selenide, calcium carbonate, barium sulfate, lead chromate, lead sulfate, barium carbonate, white lead, and alumina white. Examples of the dye include a nigrosine dye, an azo dye, a phthalocyanine dye, a quinophthalone dye, an anthraquinone dye, and a methine dye. Examples of the carbon material include carbon black. Examples of the metal material include gold, silver, and copper. Examples of the metal oxide include titanium oxide, zinc oxide, zirconium oxide, barium titanate, potassium titanate, copper-chromium oxide, copper-manganese oxide, copper-iron-manganese oxide, copper-chromium-manganese oxide, and copper-iron-chromium oxide. Examples of the polymer material include a polymer compound in which a functional group having a light absorption region in a visible light region is introduced. As long as a polymer compound having the light absorption region in the visible light region is used, the type thereof is not particularly limited.

The content (concentration) of the electrophoretic particles 10 in the insulating liquid 1 is not particularly limited, and may be, for example, from 0.1 wt % to 10 wt % both inclusive, since thereby shielding characteristics and mobility of the electrophoretic particles 10 are secured. In this case, if the content (concentration) of the electrophoretic particles 10 in the insulating liquid 1 is smaller than 0.1 wt %, the electrophoretic particles 10 may be less likely to shield (conceal) the porous layer 20. On the other hand, if the content (concentration) of the electrophoretic particles 10 in the insulating liquid 1 is larger than 10 wt %, dispersibility of the electrophoretic particles 10 is lowered, and therefore, the electrophoretic particles 10 may be less likely to be electrophoresed, and may be aggregated in some cases.

The electrophoretic particles 10 may have any optical reflection characteristics (light reflectance). Although the optical reflection characteristics of the electrophoretic particles 10 are not particularly limited, it is preferable that, at least, the electrophoretic particles 10 be allowed to shield the porous layer 20. One reason for this is that, by using a difference between the optical reflection characteristics of the electrophoretic particles 10 and the optical reflection characteristics of the porous layer 20, contrast is generated.

Specific formation materials of the electrophoretic particles 10 are selected according to a role undertaken by the electrophoretic particles 10 to generate contrast. Specifically, a material in the case of performing bright display by the electrophoretic particles 10 may be, for example, a metal oxide such as titanium oxide, zinc oxide, zirconium oxide, barium titanate, barium sulfate, and potassium titanate, or organic spherical particles such as melamine and benzoguanamine. On the other hand, a material in the case of performing dark display by the electrophoretic particles 10 may be, for example, a carbon material, a metal oxide, or the like. Examples of the carbon material include carbon black.

Examples of the metal oxide include copper-chromium oxide, copper-manganese oxide, copper-iron-manganese oxide, copper-chromium-manganese oxide, and copper-iron-chromium oxide. In particular, the carbon material is preferable, since thereby superior chemical stability, superior mobility, and superior light absorbability are obtainable.

In the case of performing the bright display by the electrophoretic particles 10, a color of the electrophoretic particles 10 viewed from outside is not particularly limited as long as contrast is allowed to be thereby generated. However, in particular, the color of the electrophoretic particles 10 viewed from the outside is preferably a color close to white, and is more preferably white. On the other hand, in the case of performing the dark display by the electrophoretic particles 10, the color of the electrophoretic particles 10 viewed from the outside is not particularly limited as long as contrast is allowed to be thereby generated. However, in particular, the color of the electrophoretic particles 10 viewed from the outside is preferably a color close to black, and is more preferably black. One reason for these is that, in both cases, high contrast is obtainable.

It is preferable that the electrophoretic particles 10 be easily dispersed and be easily charged in the insulating liquid 1 for a long time, and be less likely to be absorbed by the porous layer 20. Therefore, a disperser (or a charge adjuster) may be used in order to disperse the electrophoretic particles 10 by electrostatic repulsion, the electrophoretic particles 10 may be subjected to surface treatment, or both the foregoing methods may be used.

Examples of the disperser include Solsperse series available from Lubrizol Co., BYK series or Anti-Terra series available from BYK-Chemie Co., and Span series available from ICI Americas Co.

Examples of the surface treatment include rosin treatment, surfactant treatment, pigment derivative treatment, coupling agent treatment, graft polymerization treatment, and microcapsulation treatment. In particular, the graft polymerization treatment, the microcapsulation treatment, or a combination thereof is preferable, since thereby, for example, dispersion stability and the like are obtainable for a long time.

Examples of a material for the surface treatment include a material (absorptive material) having a functional group capable of being absorbed by the surface of the electrophoretic particles 10 and a polymerizable functional group. Absorbable functional group type is determined according to the formation material of the electrophoretic particles 10. Examples thereof include an aniline derivative such as 4-vinylaniline for a carbon material such as carbon black and an organosilane derivative such as methacrylic acid 3-(trimethoxysilyl)propyl for a metal oxide. Examples of the polymerizable functional group include a vinyl group, an acryl group, and a methacryl group.

Further, examples of the material for the surface treatment include a material (graft material) capable of being grafted to the surface of the electrophoretic particles 10 to which a polymerizable functional group is introduced. The graft material preferably has a polymerizable functional group and a dispersion functional group capable of dispersing the electrophoretic particles 10 in the insulating liquid 1 and capable of retaining dispersibility by steric hindrance. Polymerizable functional type is similar to that described for the absorptive material. Examples of the dispersion functional group include a branched alkyl group in the case where the insulating liquid 1 is paraffin. In order to polymerize or graft the graft material, for example, a polymerization initiator such as azobisisobutyronitrile (AIBN) may be used.

For reference, for details of the method of dispersing the electrophoretic particles 10 in the insulating liquid 1 as described above, descriptions are given in books such as "Dispersion Technology of Superfine Particle and Evaluation thereof: Surface Treatment, Pulverizing, and Dispersion Stabilization in Air/Liquid/Polymer" published by Science & Technology Co.

[Porous Layer]

The porous layer 20 is a three-dimensional space structure formed of the fibrous structure 21, and has a plurality of fine pores 23 formed of the three-dimensional space structure. The fibrous structure 21 includes the plurality of non-migrating particles 22. That is, the plurality of non-migrating particles 22 are held by the fibrous structure 21. In the porous layer 20 as the three-dimensional space structure, the fibrous structure 21 is configured of superposed fibers 210 extending in an identical direction or different directions (which may be any directions). In the fibrous structure 21, the fibers 210 may be intertwined with each other or one another at random, the fibers 210 may assemble and be layered at random, or both the foregoing states may exist at once. In the case where a plurality of fibrous structures 21 exist, each of the fibrous structures 21 supports one or more non-migrating particles 22. FIG. 2 illustrates a case that the porous layer 20 is formed of a plurality of fibrous structures 21.

One reason why the porous layer 20 is the three-dimensional space structure formed of the fibrous structure 21 is that, since in this case, light (outside light) is reflected diffusely (multiply scattered), and therefore, the light reflectance of the porous layer 20 is increased and the porous layer 20 may be thin to obtain such high light reflectance. Thereby, contrast of the electrophoretic device is increased, and energy necessary to move the electrophoretic particles 10 is decreased. Further, since the average pore diameter of the fine pore 23 is increased, and the number thereof is increased, the electrophoretic particles 10 easily move through the fine pores 23. Thereby, response speed is increased, and energy necessary to move the electrophoretic particles 10 is more decreased.

The fibrous structure 21 (fibers 210) is a fibrous material having a sufficiently large length with respect to the fiber diameter (diameter). The fibrous structure 21 may be, for example, formed of one or more of a polymer material, an inorganic material, and the like, and may be formed of other materials. Examples of the polymer material include nylon, polyactic acid, polyamide, polyimide, polyethylene terephthalate, polyacrylonitrile, polyethylene oxide, polyvinyl carbazole, polyvinyl chloride, polyurethane, polystyrene, polyvinyl alcohol, polysulfone, polyvinyl pyrrolidone, polyvinylidene fluoride, polyhexafluoropropylene, acetylcellulose, collagen, gelatin, chitosan, and copolymers thereof. Examples of the inorganic material include titanium oxide. In particular, as a formation material of the fibrous structure 21, the polymer material is preferable. One reason for this is that, since the polymer material has low reactivity (photoreactivity or the like), that is, the polymer material is chemically stable, unintended decomposition reaction of the fibrous structure 21 is thereby suppressed. In the case where the fibrous structure 21 is formed of a material having high reactivity, the surface of the fibrous structure 21 is preferably covered with an optional protective layer (not illustrated).

The shape (appearance) of the fibers 210 in the fibrous structure 21 is not particularly limited as long as the fibers 210 have a long and thin shape that has a sufficiently large length with respect to the fiber diameter as described above. Specifically, the shape (appearance) thereof may be linear, may be curly, or may be bent on the way. A method of forming the fibrous structure 21 is not particularly limited. The method of forming the fibrous structure 21 is preferably, for example, a phase separation method, a phase reverse method, an electrostatic (electric field) spinning method, a melt spinning method, a wet spinning method, a dry spinning method, a gel spinning method, a sol gel method, a spray coating method, or the like, since a fibrous material having a sufficiently large length with respect to the fiber diameter is easily and stably formed by the foregoing methods.

Although the fiber diameter of the fibrous structure 21 is not particularly limited, the fiber diameter thereof is preferably small as much as possible. One reason for this is that, in this case, light is easily reflected diffusely, and the pore diameter of the fine pore 23 becomes larger. However, it may be necessary to determine the fiber diameter of the fibrous structure 21 so that the fibrous structure 21 is allowed to hold the after-mentioned non-migrating particles 22. Therefore, the fiber diameter of the fibrous structure 21 is preferably from 50 nm to 2000 nm both inclusive. Further, the average fiber diameter thereof is preferably equal to or smaller than 10 μm. It is to be noted that the lower limit of the average fiber diameter is not particularly limited, and may be, for example, equal to or smaller than 0.1 μm. The fiber diameter and the average fiber diameter may be measured by microscope observation with the use of a scanning electron microscope or the like, for example. It is to be noted that the average length of the fibrous structure 21 may be any length.

In particular, the fibrous structure 21 is preferably a nanofiber. One reason for this is that, in this case, light is easily reflected diffusely, and therefore, the reflectance of the porous layer 20 is further increased. Another reason for this is that, in this case, a rate of the fine pore 23 per unit volume is increased, and therefore, the electrophoretic particles 10 easily move through the fine pores 23. Thereby, contrast is further increased, and the energy necessary to move the electrophoretic particles 10 is further decreased. The nanofiber is a fibrous material having a fiber diameter from 0.001 μm to 0.1 μm both inclusive and having a length being 100 times the fiber diameter or larger. The fibrous structure 21 as the nanofiber is preferably formed by an electrostatic spinning method, since thereby, the fibrous structure 21 having a small fiber diameter is easily and stably formed.

The fibrous structure 21 preferably has optical reflection characteristics different from those of the electrophoretic particles 10. Specifically, although the optical reflection characteristics of the fibrous structure 21 are not particularly limited, the optical reflection characteristics thereof are preferably set so that, at least, the porous layer 20 as a whole is allowed to shield the electrophoretic particles 10. One reason for this is that, as described above, in this case, by using the difference between the optical reflection characteristics of the electrophoretic particles 10 and the optical reflection characteristics of the porous layer 20, contrast is generated. Accordingly, the fibrous structure 21 having light transparency (transparent and colorless characteristics) in the insulating liquid 1 is not preferable. However, in the case where the optical reflection characteristics of the fibrous structure 21 are less likely to affect the optical reflection characteristics of the porous layer 20, and the optical reflection characteristics of the porous layer 20 are substantially determined by the optical reflection characteristics of the non-migrating particles 22, the optical reflection characteristics of the fibrous structure 21 may be any characteristics.

In this embodiment, the fibrous structure 21 as described above has a cross-linking region 21a in part thereof. As described above, the fibrous structure 21 is formed by superposing the fibers 210 each extending in any direction. The cross-linking region 21a is a section that is provided in part or all of contact points between the fibers 210, and a section where the fibers 210 are linked (united or adhered). More specifically, the cross-linking region 21a is a section in a state that different fibers 210 are not allowed to be differentiated from each other in a location where fibers 210 intersect with each other or one another, or the fibers 210 are adjacent to each other or one another.

Figure 3A:
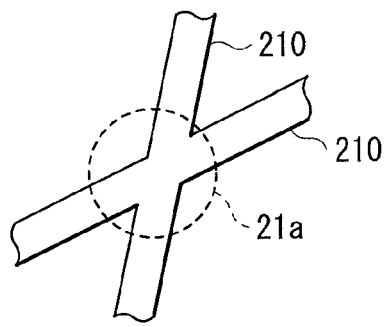
FIGS. 3A to 3D are schematic views illustrating examples of a cross-linking section.
Figure 3B:
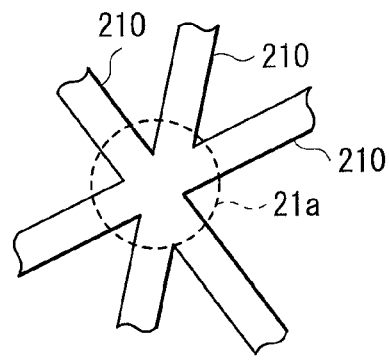
Figure 3C:
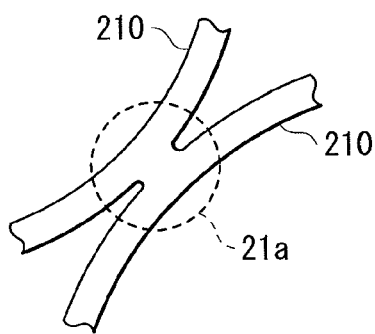
Figure 3D:
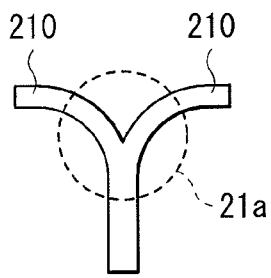

FIGS. 3A to 3C schematically illustrate examples of such a cross-linking section 21a. As illustrated in FIG. 3A, the cross-linking section 21a is provided in a location where two fibers 210 (extending in two different directions) intersect with each other. Further, as illustrated in FIG. 3B, the cross-linking section 21a may be provided in a location where three or more (in this case, three) fibers 210 intersect with one another. Alternatively, as illustrated in FIG. 3C, the cross-linking section 21a may be provided in a location where two fibers 210 in XY-plane are adjacent to each other. Alternatively, as illustrated in FIG. 3D, the cross-linking section 21a may configure a Y-shaped branching point. As described above, for example, the cross-linking section 21a may configure a branching point of the fibers 210 in the XY-plane.

Although details will be given later, examples of a method of forming the cross-linking section 21a in the fibrous structure 21 include a method of using a plurality of polymer materials as constituent materials of the fibrous structure 21. Thereby, a difference (variation) in fiber formation speed occurs, part of fibers are partially adhered to each other or one another, and accordingly, the cross-linking section 21a to link the fibers 210 to each other or one another is formed. Other examples of the method of forming the cross-linking section 21a include a method of controlling the fiber formation speed by dissolving a polymer material in a plurality of solvents or a solvent having a high boiling point and a method of changing surface properties by putting in an additive.

Such cross-linking sections 21a are desirably formed in from about 10% to about 100% both inclusive of all contact points between the fibers 210 in the fibrous structure 21. As the number of cross-linking points between the fibers is larger, volumes of the three-dimensional fine pores is decreased in the thickness direction, movement distances of the electrophoretic particles become more easily secured, and characteristics of the electrophoretic device are improved.

The average pore diameter of the fine pores 23 is not particularly limited. However, in particular, the average pore diameter thereof is preferably large as much as possible, since thereby the electrophoretic particles 21 easily move through the fine pores 23. Therefore, the average pore diameter of the fine pores 23 is preferably from 0.01 μm to 10 μm both inclusive.

Thickness of the porous layer 20 is not particularly limited, and may be, for example, from 5 μm to 100 μm both inclusive, since thereby shielding characteristics of the porous layer 20 are increased, and the electrophoretic particles 10 easily move through the fine pores 23.

The non-migrating particles 22 are held by (fixed by) the fibrous structure 21, and are particles that are not electrophoresed. Since the fibrous structure 21 includes the plurality of non-migrating particles 22, light is more easily reflected diffusely, and contrast of the electrophoretic device is further increased.

The non-migrating particles 22 in the fibrous structure 21 are preferably dispersed in a predetermined range. It is to be noted that the non-migrating particles 22 may be partially exposed from the fibrous structure 21, or may be buried in the fibrous structure 21, as long as the non-migrating particles 22 are held by the fibrous structure 21.

The non-migrating particles 22 have optical reflection characteristics different from those of the electrophoretic particles 10. Although the optical reflection characteristics of the non-migrating particles 22 are not particularly limited, the optical reflection characteristics thereof are preferably set so that, at least, the porous layer 20 as a whole is allowed to shield the electrophoretic particles 22. One reason for this is that, as described above, by using the difference between the optical reflection characteristics of the electrophoretic particles 10 and the optical reflection characteristics of the porous layer 20, contrast is allowed to be generated. It is to be noted that in this case, the light reflectance of the non-migrating particles 22 is higher than the light reflectance of the electrophoretic particles 10.

A formation material of the non-migrating particles 22 is selected according to a role undertaken by the non-migrating particles 22 for generating contrast. Specifically, a material in the case of performing the bright display by the non-migrating particles 22 is similar to the material selected in the case of performing the bright display by the electrophoretic particles 10. On the other hand, a material in the case of performing the dark display by the non-migrating particles 22 is similar to the material selected in the case of performing the dark display by the electrophoretic particles 10. In particular, as the material selected in the case of performing the bright display by the non-migrating particles 22, a metal oxide is preferable, since thereby superior chemical stability, superior fixing characteristics, and superior light reflectance are obtainable. The formation material of the non-migrating particles 22 may be the same type as that of the formation material of the electrophoretic particles 10, or may be different type from that of the formation material of the electrophoretic particles 10, as long as contrast is allowed to be thereby generated. It is to be noted that a color viewed in the case of performing the bright display or the dark display by the non-migrating particles 22 is similar to the case described for the viewed color of the electrophoretic particles 10.

1-2. Method of Forming Porous Layer

Figure 4:
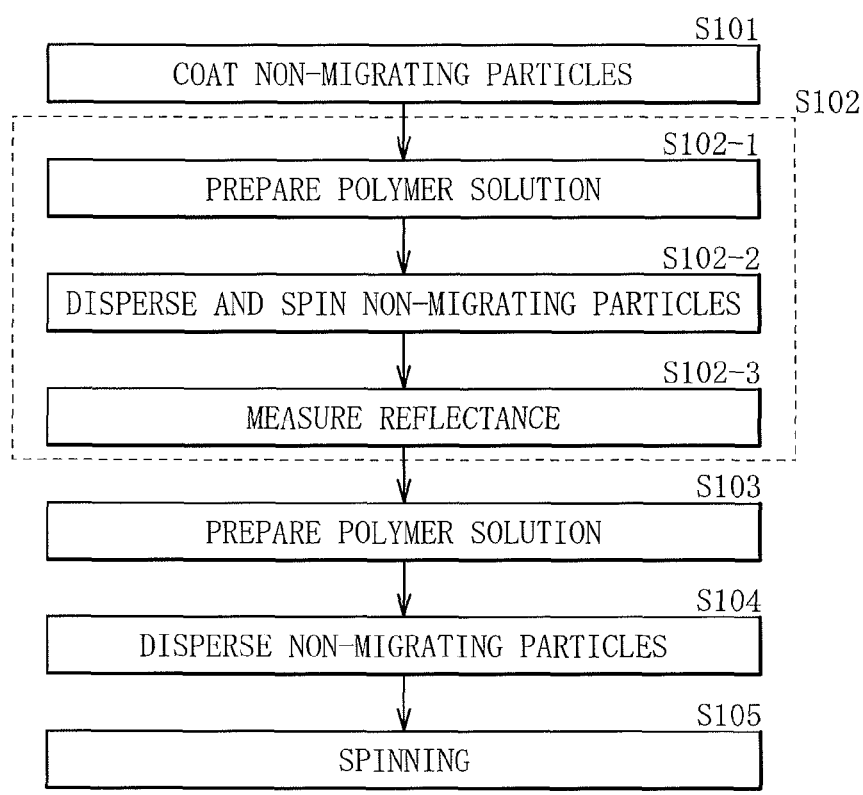
FIG. 4 is a flowchart illustrating steps of manufacturing the electrophoretic device illustrated in FIG. 1.

An example of formation procedure of the porous layer 20 is as follows. FIG. 4 illustrates a flow of the formation procedure of the porous layer 20. First, the non-migrating particles 22 to be dispersed in the fibrous structure 21 are coated with a polymer material (step S101). Specifically, the non-migrating particles 22 (such as titanium oxide) and a polymer material (such as polyacrylic acid) for coating are kneaded, and the non-migrating particles 22 are coated with the polymer material.

Next, an optimal range of an additive amount of the non-migrating particles 22 (for convenience of description, referred to as "non-migrating particles 22'") coated with the polymer material is determined (step S102). Specifically, a polymer solution obtained by dissolving a polymer material (such as polyacrylonitrile) as a material (main material) of the fibrous structure 21 in an organic solvent (such as N,N'-dimethylformamide (DMF)) is prepared (step S102-1). The polymer solution is separated into a plurality of portions, and the non-migrating particles 22' are dispersed in the plurality of portions of the polymer solution. At this time, a plurality of dispersive solutions of the non-migrating particles 22' are prepared, and the concentrations of the respective dispersive solutions become different by 5 wt % and the respective dispersive solutions are sufficiently stirred. Next, spinning is performed on the respective dispersive solutions using an electrostatic spinning method to form each fibrous structure 21 (step S102-2). Thereafter, light reflectance of each fibrous structure 21 with each concentration is measured to determine the optimal range of the additive amount of the non-migrating particles 22 (step S102-3). Thereafter, a polymer solution is prepared as in the foregoing step S102-1 (step S103), and subsequently, the non-migrating particles 22' in the optimal range determined in the foregoing step S102 is added thereto to prepare a dispersive solution (step S104). Next, spinning is performed by an electrostatic spinning method using the polymer solution in which the non-migrating particles 22' are dispersed to form the fibrous structure 21 (step S105). Thereby, the porous layer 20 having improved light-scattering efficiency is obtained while movement paths (fine pores 23) of the electrophoretic particles 10 are secured.

In this embodiment, as described above, the fibrous structure 21 includes the predetermined cross-linking sections 21a. Examples of a method of forming the cross-linking section 21a include a method using a plurality of polymer materials as constituent materials of the fibrous structure 21. By using a plurality of polymer materials having different surface tension, a difference (variation) in fiber formation speed occurs at the time of spinning, part of fibers is partially adhered (conglutinated) to each other or one another, and accordingly, the cross-linking sections 21a to link the fibers 210 to each other or one another are formed. Specifically, in this case, in the fibrous structure 21, a polymer material (referred to as polymer 2) (such as polyacrylic acid) having surface tension different from that of a main polymer material (referred to as polymer 1) (such as polyacrylonitrile) is added. The surface tension of polyacrylonitrile is from 45 mN/m to 55 mN/m both inclusive, and the surface tension of polyacrylic acid is from 55 mN/m to 74 mN/m both inclusive. In an electric field spinning method, a high voltage is applied to a polymer solution, and a thread is spun when the electric field and surface tension are balanced out. Therefore, a polymer material (such as the polymer 1) having small surface tension is likely to become fibers faster. On the contrary, a polymer material (such as the polymer 2) having large surface tension becomes fibers slower than the polymer 1 does. Therefore, for example, by adding the polymer 2 having surface tension larger than that of the polymer 1 to the polymer 1, the cross-linking sections 21a are formed.

As described above, by spinning with the use of a solution containing a plurality of polymer materials having different surface tension, the fibrous structure 21 having the cross-linking sections 21a is formed. However, it may be necessary that the polymers 1 and 2 are allowed to be dissolved in the same solvent. Further, in the case where the surface tension of the polymer 1 is different from that of the polymer 2, and fiber forming speed of the polymer 1 is different even slightly from that of the polymer 2, the cross-linking sections 21a are allowed to be formed. With regard to rates of the polymers 1 and 2, a ratio between the non-migrating particles 22 and the polymer 2 is desirably set in a range determined by the upper limit and the lower limit described below, if the additive amount of the non-migrating particles 22 to the polymer 1 is constant. The lower limit is based on a result of Example 1 described later, and the upper limit is based on a result of Example 4 described later.

| Lower limit | non-migrating particles 22:polymer 2 = 95:5 |
| Upper limit | non-migrating particles 22:polymer 2 = 65:35 |

As the method of forming the cross-linking section 21a, a method other than the foregoing method may be used. Examples thereof include a method of controlling fiber formation speed by dissolving a polymer material in a plurality of solvents or a solvent having a high boiling point and a method of changing surface properties by putting in an additive.

[Preferable Display Method of Electrophoretic Device]

In the electrophoretic device, as described above, each of the electrophoretic particles 10 and the porous layer 20 (the fibrous structure 21 containing the non-migrating particles 22) performs the bright display or the dark display, and thereby contrast is generated. In this case, the bright display may be performed by the electrophoretic particles 10 while the dark display is performed by the porous layer 20, or vice versa. Such a difference in roles is determined by relation between the optical reflection characteristics of the electrophoretic particles 10 and the optical reflection characteristics of the porous layer 20. That is, the reflectance of a component performing the bright display is higher than the reflectance of a component performing the dark display.

In particular, it is preferable that the dark display be performed by the electrophoretic particles 10 and the bright display be performed by the porous layer 20. Accordingly, in the case where the optical characteristics of the porous layer 20 are substantially determined by the optical reflection characteristics of the non-migrating particles 22, the reflectance of the non-migrating particles 22 is preferably higher than the reflectance of the electrophoretic particles 10. The reflectance for the bright display in this case is remarkably increased by utilizing diffuse reflection of light by the porous layer 20 (three-dimensional space structure), and therefore, contrast is remarkably increased accordingly.

[Operation of Electrophoretic Device]

In the electrophoretic device, the optical reflection characteristics of the electrophoretic particles 10 are different from the optical reflection characteristics of the porous layer 20 (non-migrating particles 22). In this case, in the case where an electric field is applied to the electrophoretic device, the electrophoretic particles 10 are moved through the porous layer 20 (fine pores 23) in a range in which the electric field is applied. Thereby, if the electrophoretic device is viewed from the side toward which the electrophoretic particles 10 are moved, the dark display (or the bright display) is performed by the electrophoretic particles 10 in a range in which the electrophoretic particles 10 are moved, and the bright display (or the dark display) is performed by the porous layer 20 in a range in which the electrophoretic particles 10 are not moved. Thereby, contrast is generated.

As described above, methods of improving display quality of electrophoretic displays, in particular, contrast and response speed thereof have been searched. For example, one of the methods is a method of improving contrast by adding non-migrating particles having optical reflection characteristics different from optical reflection characteristics of electrophoretic particles performing the dark display (or the bright display) to a fibrous structure configuring a porous layer performing the bright display (or the dark display) as in this embodiment. Thereby, contrast becomes higher than that of the existing electrophoretic displays, and response speed of the electrophoretic particles is increased.

[Function and Effect]

In this embodiment, in the porous layer 20, the fibrous structure 21 includes the cross-linking sections 21a. Thereby, compared to an electrophoretic device using a fibrous structure not having the cross-linking sections 21a, light-scattering efficiency is improved, and reflectance in the porous layer 20 is improved. In this case, it is concerned that, since the fibrous structure 21 includes the cross-linking sections 21a, volume of the three-dimensional fine pores 23 is decreased, and the electrophoretic particles 10 are less likely to be migrated physically. However, such a decreased volume is caused by a reduced width (thickness of the fibrous structure 21) along a movement direction of the electrophoretic particles 10, which leads to reduction of a movement distance of the electrophoretic particles 10. Further, since crossing portions (superposed portions) of the fibers 210 are linked, a space in which the electrophoretic particles 10 are physically trapped is decreased. Accordingly, response speed is improved.

Therefore, in this embodiment, since the fibrous structure 21 configuring the porous layer 20 includes the predetermined cross-linking sections 21a in contact points between the fibers 210, light-scattering efficiency in the porous layer 20 is improved while movement paths of the electrophoretic particles 10 are secured. Therefore, high contrast and high-speed response are achieved.

Further, since the response speed is improved, for example, in an electronic unit such as a display unit utilizing the foregoing electrophoretic device as a pixel, power consumption is decreased.

2. [Application Example Of Electrophoretic Device]

Next, a description will be given of an application example of the foregoing electrophoretic device. The electrophoretic device is applicable to various electronic units, and types of the electronic units are not particularly limited. For example, the electrophoretic device is applied to a display unit.

[Whole Configuration of Display Unit]

Figure 5:
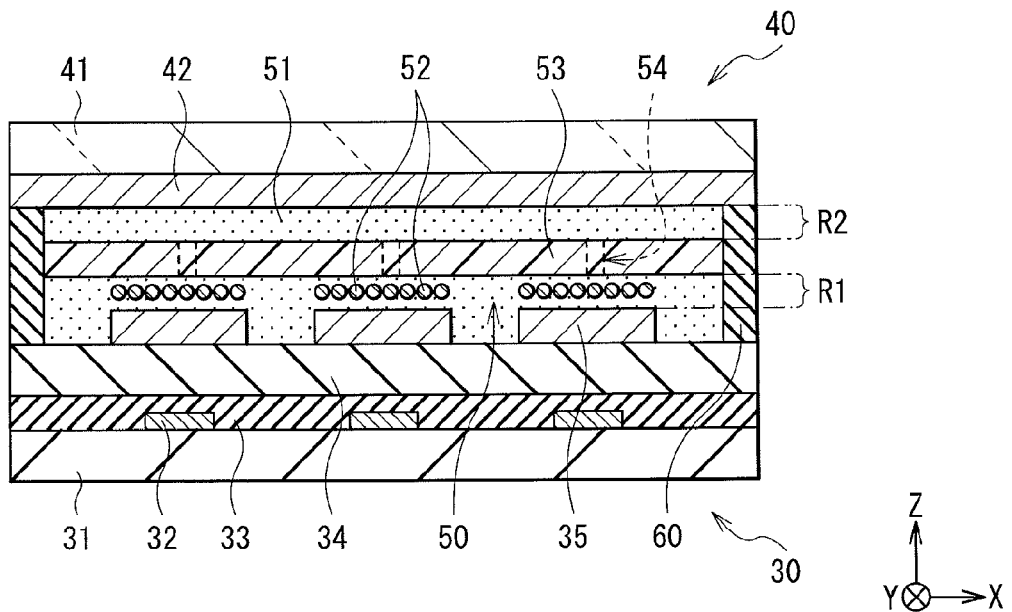
FIG. 5 is a cross-sectional view illustrating a configuration of a display unit using the electrophoretic device according to the embodiment of the present technology.
Figure 6:
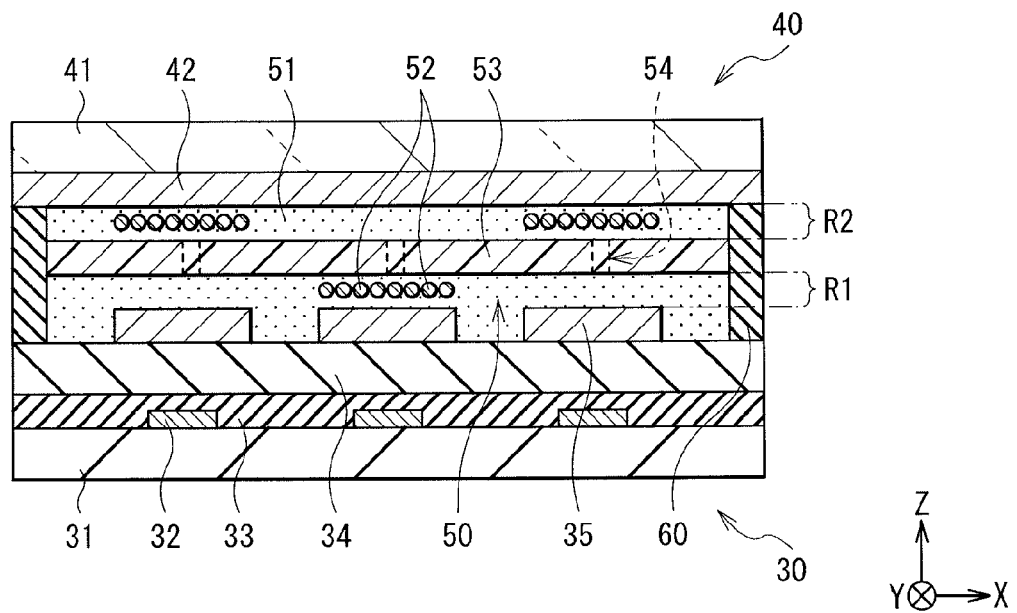
FIG. 6 is a cross-sectional view for explaining operation of the display unit.

FIG. 5 illustrates a cross-sectional configuration of a display unit. FIG. 6 is a diagram for explaining operation of the display unit illustrated in FIG. 5. It is to be noted that the following configuration of the display unit is merely an example, and may be changed as appropriate.

The display unit is an electrophoretic display (so-called electronic paper display) for displaying an image (such as textual information) utilizing an electrophoretic phenomenon. In the display unit, for example, as illustrated in FIG. 5, a drive substrate 30 and an opposed substrate 40 are oppositely arranged with an electrophoretic device 50 in between. For example, in the display unit, an image is displayed on the opposed substrate 40 side. It is to be noted that the drive substrate 30 and the opposed substrate 40 are separated from each other by a spacer 60 to have a predetermined interval.

[Drive Substrate]

In the drive substrate 30, for example, a plurality of thin film transistors (TFTs) 32, a protective layer 33, a planarizing insulating layer 34, and a plurality of pixel electrodes 35 are formed in this order over one surface of a support base 31. The TFT 32 and the pixel electrode 35 are arranged in a state of matrix or in a state of segment according to a pixel pattern.

The support base 31 may be formed of, for example, an inorganic material, a metal material, a plastic material, or the like. Examples of the inorganic material include silicon (Si), silicon oxide ($SiO_x$), silicon nitride ($SiN_x$), and aluminum oxide ($AlO_x$). Examples of the silicon oxide include glass and spin-on glass (SOG). Examples of the metal material include aluminum (Al), nickel (Ni), and stainless steel. Examples of the plastic material include polycarbonate (PC), polyethylene terephthalate (PET), polyethylene naphthalate (PEN), and polyethyl ether ketone (PEEK).

The support base 31 may be light transmissive or non-light transmissive. Since an image is displayed on the opposed substrate 40 side, the support base 31 is not necessarily light transmissive. Further, the support base 31 may be a substrate having rigidity such as a wafer, or may be a thin-layer glass, a film, or the like having flexibility. In particular, the latter type is preferable, since thereby, a flexible (bendable) display unit is achieved.

The TFT 32 is a switching-use device for selecting a pixel. It is to be noted that the TFT 32 may be an inorganic TFT using an inorganic semiconductor layer as a channel layer, or may be an organic TFT using an organic semiconductor layer. The protective layer 33 and the planarizing insulating layer 34 may be formed of, for example, an insulating resin material such as polyimide. However, as long as the surface of the protective layer 33 is sufficiently flat, the planarizing insulating layer 34 may be omitted. The pixel electrode 35 may be formed of, for example, a metal material such as gold (Au), silver (Ag), and copper (Cu). The pixel electrode 35 is connected to the TFT 32 through a contact hole (not illustrated) provided in the protective layer 33 and the planarizing insulating layer 34.

[Opposed Substrate]

In the opposed substrate 40, for example, a counter electrode 42 is formed entirely to cover one surface of a support base 41. The counter electrode 42 may be formed in a state of matrix or in a state of segment as the pixel electrode 32 may be.

The support base 41 is formed of a similar material to that of the support base 31, except that the support base 41 is light transmissive. One reason for this is that, since an image is displayed on the opposed substrate 40 side, it may be necessary that the support base 41 is light transmissive. The counter electrode 42 may be formed of, for example, a light transmissive conductive material (transparent electrode material) such as indium-tin oxide (ITO), antimony-tin oxide (ATO), fluorine-doped tin oxide (FTO), and aluminum-doped zinc oxide (AZO).

In the case where an image is displayed on the opposed substrate 40 side, viewers view the electrophoretic device 50 through the counter electrode 42. Therefore, light transmission characteristics (transmittance) of the counter electrode 42 are preferably high as much as possible, and may be, for example, equal to or higher than 80%. Further, electric resistance of the counter electrode 42 is preferably low as much as possible, and for example, may be equal to or smaller than 100Ω/□.

[Electrophoretic Device]

The electrophoretic device 50 has a configuration similar to that of the foregoing electrophoretic device. Specifically, the electrophoretic device 50 includes a plurality of electrophoretic particles 52 and a porous layer 53 having a plurality of fine pores 54 in an insulating liquid 51. The insulating liquid 51 occupies, for example, a space between the drive substrate 30 and the opposed substrate 40. For example, the porous layer 53 may be held by the spacer 60. The space occupied by the insulating liquid 51 is divided into a refuge region R1 closer to the pixel electrode 35 and a movement region R2 closer to the counter electrode 42 with the porous layer 53 in between as a border. Configurations of the insulating liquid 51, the electrophoretic particles 52, and the porous layer 53 are similar to the configurations of the insulating liquid 1, the electrophoretic particles 10, and the porous layer 20. It is to be noted that FIG. 5 and FIG. 6 illustrate only part of the fine pores 54 to simplify illustrated content.

[Spacer]

The spacer 60 may be formed of, for example, an insulating material such as a polymer material.

A shape of the spacer 60 is not particularly limited. In particular, the shape of the spacer 60 is preferably a shape that does not prevent movement of the electrophoretic particles 52 and uniformly distributes the electrophoretic particles 52. For example, the shape of the spacer 60 may be a lattice-like shape. Further, a thickness of the spacer 60 is not particularly limited. In particular, the thickness of the spacer 60 is preferably small as much as possible in order to decrease power consumption, and may be, for example, from 10 μm to 100 μm both inclusive.

[Operation of Display Unit]

In the display unit, as illustrated in FIG. 5, in an initial state, the plurality of electrophoretic particles 52 are located in the refuge region R1. In this case, the electrophoretic particles 52 are shielded by the porous layer 53 in all pixels, and therefore, contrast is not generated (an image is not displayed) when the electrophoretic device 50 is viewed from the opposed substrate 40 side.

When a pixel is selected by the TFT 32 and an electric field is applied between the pixel electrode 35 and the counter electrode 42, as illustrated in FIG. 6, the electrophoretic particles 52 are moved from the refuge region R1 toward the movement region R2 thorough the porous layer 53 (fine pores 54). In this case, since pixels in which the electrophoretic particles 52 are shielded by the porous layer 53 and pixels in which the electrophoretic particles 52 are not shielded by the porous layer 53 coexist, and therefore, contrast is generated when the electrophoretic device 50 is viewed from the opposed substrate 40 side. Thereby, an image is displayed.

[Function and Effect of Display Unit]

According to the display unit, the electrophoretic device 50 has a configuration similar to that of the foregoing electrophoretic device. Therefore, high contrast, high-speed response, and low power consumption are achieved. Accordingly, a high-quality image is displayed with low power consumption.

3. EXAMPLES

Next, a description will be given in detail of examples of the embodiment of the present technology.

Examples 1 and 2

A display unit was fabricated using black electrophoretic particles (for dark display) and a white porous layer (particle-containing fibrous structure) (for bright display) by the following procedure.

[Preparation of Electrophoretic Particles]

43 g of sodium hydroxide and 0.37 g of sodium silicate were dissolved in 43 g of water to obtain solution A. Subsequently, while the solution A was stirred, 5 g of composite oxide fine particles (DAIPYROXIDE Color TM9550, available from Dainichiseika Color & Chemicals Mfg. Co., Ltd.) was added to the resultant, which was stirred (15 minutes). Thereafter, ultrasonic stirring (15 minutes, from 30 deg C. to 35 deg C. both inclusive) was performed. Next, the solution A was heated (90 deg C.). Thereafter, 15 cm$^3$ (=ml) of sulfuric acid of 0.22 mol/cm$^3$ and 7.5 cm$^3$ of an aqueous solution in which 6.5 mg of sodium silicate and 1.3 mg of sodium hydroxide were dissolved were dropped for 2 hours. Subsequently, after the solution A was cooled down (room temperature), 1.8 cm$^3$ of sulfuric acid of 1 mol/cm$^3$ was added thereto. Thereafter, centrifugal separation (30 minutes, 3700 rpm) and decantation were performed. Next, operation in which after redispersion was performed with the use of ethanol, centrifugal separation (30 minutes, 3500 rpm) was performed, and decantation was performed was made twice. Thereafter, a mixed solution of 5 cm$^3$ of ethanol and 0.5 cm$^3$ of water was added to each bottle, ultrasonic stirring (1 hour) was performed, and thereby, a dispersion solution composed of silane coated composite oxide particles was obtained.

Next, 3 cm$^3$ of water, 30 cm$^3$ of ethanol, and 4 g of N-[3-(trimethoxysilyl)propyl]-N'-(4-vinylbenzil)ethylenediamine hydrochloride salt (40% methanol solution) were mixed, and the mixture was stirred (7 minutes). Thereafter, the entire amount of the dispersion solution was put therein. Subsequently, after the mixed solution was stirred (10 minutes), centrifugal separation (30 minutes, 3500 rpm) was performed. Next, after decantation was performed, washing operation in which after redispersion was performed with the use of ethanol, centrifugal separation (30 minutes, 3500 rpm) was performed was made twice. Subsequently, after decantation was performed, the resultant was dried (6 hours) in reduced pressure environment (room temperature). Thereafter, the resultant was further dried (2 hours) in reduced pressure environment (70 deg C.), and thereby, a solid material was obtained. Subsequently, the solid material was added with 50 cm$^3$ of toluene to obtain solution B. Thereafter, the resultant was stirred by a roll mill (12 hours). Next, the solution B was moved to a three-neck flask, into which 0.5 g of acrylic acid and 2.0 g of 2,5-dimethyl-1,5-hexadiene were put. Thereafter, the resultant was stirred under nitrogen gas stream (20 minutes). Next, the solution B was further stirred (20 minutes, 50 deg C.). Thereafter, the resultant was added with solution C in which 0.01 g of AIBN was dissolved in 3 cm$^3$ of toluene, and was subsequently heated (65 deg C.). Subsequently, after the mixed solution was stirred (1 hour), the mixed solution was cooled down (room temperature), and was put into a bottle together with ethyl acetate, and centrifugal separation (30 minutes, 3500 rpm) was performed. Next, after decantation was performed, washing operation in which after redispersion was performed with the use of ethyl acetate and centrifugal separation (30 minutes, 3500 rpm) was performed was made three times. Subsequently, after the resultant was dried (12 hours) in reduced pressure environment (room temperature), the resultant was further dried (2 hours) in reduced pressure environment (70 deg C.). Thereby, black electrophoretic particles configured of polymer coated pigment was obtained.

[Preparation of Insulating Liquid]

Next, as an insulating liquid, an organic solvent containing 0.75% of methoxysulfonyloxymethane (Solsperse 17000, available from Lubrizol Co.), 5.0% of sorbitantrioleate (Span 85), 94% of an isoparaffin (IsoparG, available from Exxon Mobil Corporation) as a first component was prepared. In this case, as necessary, 0.2 g of the electrophoretic particles was added to 9.7 g of the insulating liquid, and the resultant was stirred (1 hour) in a beads mill to which glass beads (0.8 mm φ) were added. Subsequently, after the mixed solution was subjected to a glass fiber filter to remove the beads. Thereby, an insulating liquid in which electrophoretic particles were dispersed was obtained.

[Preparation of Porous Layer]

Example 1-1

Next, 16 g of polyacrylonitrile (available from Aldrich Co., molar weight: 150000) as a formation material of a fibrous structure was dissolved in 84 g of DMF to prepare solution D. On the other hand, for example, titanium oxide was prepared as non-migrating particles, and the non-migrating particles were coated with an acryl resin (polyacrylic resin). At this time, weight ratio was titanium oxide:acryl resin=95:5. Subsequently, titanium oxide after coating processing was added to the solution D. Thereafter, the resultant was mixed in a beads mill to prepare a spinning solution. It is to be noted that concentration of titanium oxide after coating processing was 30 wt %. Subsequently, the spinning solution was thrown in a syringe, and 8 round trips of spinning were performed by using an electric field spinning apparatus (NANON, available from MECC Co., Ltd.) on a glass substrate on which a pixel electrode (ITO) in the shape of a predetermined pattern was formed. As spinning conditions, electric field intensity was 28 kV, discharge rate was 0.5 cm$^3$/min, fiber forming distance was 15 cm, and scanning rate was 20 mm/sec. Subsequently, the glass substrate was dried for 12 hours in a vacuum oven (75 deg C.) to form a fibrous structure containing non-migrating particles. When the fibrous structure was observed by a scanning electron microscope, a cross-linking structure as illustrated in FIG. 1 was seen in the fibrous structure. A fiber diameter thereof was from 0.1 μm to 2 μm both inclusive.

Example 1-2

Further, a fibrous structure was formed in a manner similar to that of the foregoing Example 1-1, except that the weight ratio between titanium oxide and acryl resin was 90:10, and solution obtained by dissolving 15 g of polyacrylonitrile (available from Aldrich Co., molar weight: 150000) in 85 g of DMF was used as the solution D. In Example 1-2, when the fibrous structure was observed by a scanning electron microscope, a cross-linking structure as illustrated in FIG. 1 was seen in the fibrous structure as well. A fiber diameter thereof was from 0.1 μm to 2 μm both inclusive.

Example 1-3

Further, a fibrous structure was formed in a manner similar to that of the foregoing Example 1-1, except that the weight ratio between titanium oxide and acryl resin was 70:30, and solution obtained by dissolving 11 g of polyacrylonitrile (available from Aldrich Co., molar weight: 150000) in 89 g of DMF was used as the solution D. In Example 1-3, when the fibrous structure was observed by a scanning electron microscope, the cross-linking structure as illustrated in FIG. 1 was seen in the fibrous structure as well. A fiber diameter thereof was from 0.1 μm to 2 μm both inclusive.

Example 1-4

Further, a fibrous structure was formed in a manner similar to that of the foregoing Example 1-1, except that the weight ratio between titanium oxide and acryl resin was 65:35, and solution obtained by dissolving 10 g of polyacrylonitrile (available from Aldrich Co., molar weight: 150000) in 90 g of DMF was used as the solution D. In Example 1-4, when the fibrous structure was observed by a scanning electron microscope, the cross-linking structure as illustrated in FIG. 1 was seen in the fibrous structure as well. A fiber diameter thereof was from 0.1 to 2 μm both inclusive.

Example 1-5

Further, a fibrous structure was formed in a manner similar to that of the foregoing Example 1-1, except that the weight ratio between titanium oxide and acryl resin was 65:35, and solution obtained by dissolving 7 g of polyacrylonitrile (available from Aldrich Co., molar weight: 150000) in 93 g of DMF was used as the solution D. In Example 1-5, when the fibrous structure was observed by a scanning electron microscope, the cross-linking structure as illustrated in FIG. 1 was seen in the fibrous structure as well. However, a fiber diameter thereof was from 0.1 μm to 3 μm both inclusive, which was comparatively large. Further, in the fibrous structure, bead-like blocks from 3 μm to 5 μm both inclusive existed in places.

Comparative Example

As a comparative example of the foregoing Examples 1-1 to 1-5, a fibrous structure was formed using titanium oxide as non-migrating particles without being coated, and using solution obtained by dissolving 17 g of acrylonitrile (available from Aldrich Co., molar weight: 150000) in 83 g of DMF as the solution D. However, the fibrous structure was formed in a manner similar to that of the foregoing Example 1-1, except for the solution D and except that the titanium oxide were not coated. In the comparative example, when the fibrous structure was observed by a scanning electron microscope, while a fiber diameter thereof was from 0.1 μm to 2 μm both inclusive, the cross-linking structure as illustrated in FIG. 1 was not seen in the fibrous structure.

[Assembly of Display Unit]

An Unnecessary fibrous structure attached to a region where a pixel electrode was not formed was removed from a glass substrate on which the pixel electrode was formed. Thereafter, a PET film (being 30 μm thick) as a spacer was put on a glass substrate on which a counter electrode (ITO) was entirely formed. The glass substrate on which the pixel electrode and the fibrous structure were formed was layered thereon. It is to be noted that tracing was made by using a photocurable resin (photosensitive resin Photoreck A-400, available from Sekisui Chemical Co., Ltd.) containing beads (outer diameter: 30 μm) in location on which the porous layer was not layered. Finally, the insulating liquid in which the electrophoretic particles were dispersed was injected into a gap between the two glass substrates. Thereafter, after the porous layer became adjacent to the pixel electrode and the counter electrode by entirely pressing with a roller, the entire body was further pressed to compress the porous layer.

As performances of the display units of Examples 1-1 to 1-5 and the comparative example, reflectance X (%), black reflectance (%), white reflectance (%), contrast, and response speed (ms) at the time of injecting only the insulating liquid into the fibrous structure were measured. Results illustrated in Table 1 were obtained.

measured by applying a shortwave electric field (15 V) with the use of a function generator (available from TOYO Corporation). Response speed refers to an average value of time necessary to change the luminance from 0.1 to 0.9 by applying an electric field and time necessary to change the luminance from 0.9 to 0.1 after stopping application of the electric field under the conditions in which the luminance in a white state was 1 and the luminance in a black state was 0.

From Table 1, it is found that, in the case where comparison is made between Examples 1-1 to 1-5 and the comparative example, reflectance and contrast of each of Examples 1-1 to 1-4 are higher than those of the comparative example. Such a fact suggests that passing characteristics of the electrophoretic particles are improved, and characteristics of the reflective display system are allowed to be improved without damaging reflection efficiency of non-migrating particles. Further, in Examples 1-1 to 1-5, despite the improved contrast, the response speed is increased as well. Such a fact is a result confirming the improved passing characteristics of the electrophoretic particles. Further, in Example 1-5, the reflectance X (%) at the time of injecting only the insulating liquid into the fibrous structure is decreased. This is caused by a fact that the non-migrating particles are not efficiently dispersed on fibers and scattering efficiency is decreased since the fiber diameter is out of the foregoing preferred range. However, since the contrast is decreased, apparent response speed is increased. Therefore, it is desirable that the fiber diameter in the fibrous structure be equal to or less than 2000 nm (2 μm) as described above.

While the present technology has been described with reference to the embodiment, the present technology is not limited to the examples described in the foregoing embodiment, and various modifications may be made. For example, application of the electrophoretic device of the present technology is not limited to the display unit, and the electrophoretic device of the present technology may be applied to other electronic units.

It is possible to achieve at least the following configurations from the above-described exemplary embodiment and the modifications of the disclosure.

(1) An electrophoretic device including:

TABLE 1

| | Coating polymer (wt %) | Titanium oxide (wt %) | X (%) | White reflectance (%) | Black reflectance (%) | Contrast | Response speed (ms) | Presence Of cross-linking point | Fiber diameter (μm) |
|---|---|---|---|---|---|---|---|---|---|
| Example 1-1 | 5 | 95 | 57 | 47 | 1 | 47 | 800 | o | 0.1-2 |
| Example 1-2 | 10 | 90 | 57 | 46 | 1 | 46 | 790 | o | 0.1-2 |
| Example 1-3 | 30 | 70 | 57 | 48 | 1 | 48 | 780 | o | 0.1-2 |
| Example 1-4 | 35 | 65 | 57 | 46 | 1 | 46 | 800 | o | 0.1-2 |
| Example 1-5 | 35 | 65 | 42 | 30 | 3 | 10 | 800 | o | 0.1-5 |
| Comparative example | 0 | 100 | 57 | 45 | 2 | 23 | 1080 | x | 0.1-2 |

After an alternating-current voltage (0.1 Hz and 15 V) was applied for 1 hour, the black reflectance and the white reflectance in the substrate normal line direction with respect to a standard diffusion plate were measured with 45-deg ring lighting by a spectral photometer (eye-one pro, available from X-Rite). Contrast ratio (CR) was a value obtained by dividing the white reflectance by the black reflectance. Luminance was in an insulating liquid
a plurality of electrophoretic particles; and
a porous layer formed of a fibrous structure, the fibrous structure including a plurality of non-migrating particles, wherein
the fibrous structure is configured of superposed fibers extending in an identical direction or different directions, and (1) includes a cross-linking section in which the fibers are linked to each other in part or all of contact points between the fibers.

(2) The electrophoretic device according to (1), wherein the cross-linking section is a branching point between the fibers in a plane perpendicular to a lamination direction in the fibrous structure.

(3) The electrophoretic device according to (1) or (2), wherein an average pore diameter in a plane perpendicular to a lamination direction of the fibrous structure is from about 0.1 micrometers to about 10 micrometers both inclusive.

(4) The electrophoretic device according to any one of (1) to (3), wherein a fiber diameter of the fibrous structure is from about 50 nanometers to about 2000 nanometers both inclusive.

(5) The electrophoretic device according to any one of (1) to (4), wherein the fibrous structure is formed of one of a polymer material and an inorganic material.

(6) The electrophoretic device according to any one of (1) to (5), wherein an average fiber diameter of the fibrous structure is from about 0.1 micrometers to about 10 micrometers both inclusive.

(7) The electrophoretic device according to any one of (1) to (6), wherein the fibrous structure is formed by an electrostatic spinning method.

(8) The electrophoretic device according to any one of (1) to (7), wherein the non-migrating particles have optical reflection characteristics different from optical reflection characteristics of the electrophoretic particles.

(9) The electrophoretic device according to any one of (1) to (8), wherein the non-migrating particles are each formed of one of an organic pigment, an inorganic pigment, a dye, a carbon material, a metal material, a metal oxide, glass, and a polymer material.

(10) The electrophoretic device according to any one of (1) to (9), wherein the non-migrating particles each include titanium oxide.

(11) The electrophoretic device according to any one of (1) to (10), wherein reflectance of the non-migrating particles is higher than reflectance of the electrophoretic particles.

(12) A method of manufacturing an electrophoretic device, the method including:
forming a fibrous structure configured of superposed fibers that extend in an identical direction or different directions; and
forming a porous layer by adding non-migrating particles to the fibrous structure and dispersing the non-migrating particles in the fibrous structure,
wherein a cross-linking section in which the fibers are linked to each other is formed in part or all of contact points between the fibers of the fibrous structure.

(13) The method of manufacturing the electrophoretic device according to (12), wherein the fibrous structure is formed by an electrostatic spinning method.

(14) The method of manufacturing the electrophoretic device according to (13), wherein the cross-linking section in the fibrous structure is formed using a plurality of polymer materials having different surface tension.

(15) The method of manufacturing the electrophoretic device according to (14), further including coating the non-migrating particles with a polymer material having surface tension that is larger than surface tension of a main polymer material configuring the fibrous structure before the adding of the non-migrating particles to the fibrous structure.

(16) A display unit provided with an electrophoretic device between a pair of bases, one or both of which are light transmissive, the pair of bases each being provided with an electrode, the electrophoretic device including:
in an insulating liquid
a plurality of electrophoretic particles; and
a porous layer formed of a fibrous structure, the fibrous structure including a plurality of non-migrating particles, wherein
the fibrous structure is configured of superposed fibers extending in an identical direction or different directions, and includes a cross-linking section in which the fibers are linked to each other in part or all of contact points between the fibers.

The present disclosure contains subject matter related to that disclosed in Japanese Priority Patent Application JP 2012-127981 filed in the Japan Patent Office on Jun. 5, 2012, the entire contents of which is hereby incorporated by reference.

It should be understood by those skilled in the art that various modifications, combinations, sub-combinations, and alternations may occur depending on design requirements and other factors insofar as they are within the scope of the appended claims or the equivalents thereof.

What is claimed is:

1. An electrophoretic device comprising:
in an insulating liquid:
a plurality of electrophoretic particles; and
a porous layer formed of a plurality of fibrous structures, the plurality of fibrous structures comprising a plurality of non-migrating particles,
wherein each of the plurality of fibrous structures comprises two or more superposed fibers extending in an identical direction or different directions, and wherein the two or more superposed fibers are adhered to each other at one or more points of contact between the two or more superposed fibers to form one of the plurality of fibrous structures.

2. The electrophoretic device according to claim 1, wherein the one or more points of contact of the two or more superposed fibers comprises a branching point between the two or more superposed fibers in a plane perpendicular to a lamination direction in the plurality of fibrous structures.

3. The electrophoretic device according to claim 1, wherein an average pore diameter in a plane perpendicular to a lamination direction of the plurality of fibrous structures is from about 0.1 micrometers to about 10 micrometers.

4. The electrophoretic device according to claim 1, wherein a fiber diameter of the plurality of fibrous structures is from about 50 nanometers to about 2000 nanometers.

5. The electrophoretic device according to claim 1, wherein each of the plurality of fibrous structures is formed of one of a polymer material or an inorganic material.

6. The electrophoretic device according to claim 1, wherein an average fiber diameter of each of the plurality of fibrous structures is from about 0.1 micrometers to about 10 micrometers.

7. The electrophoretic device according to claim 1, wherein each of the plurality of fibrous structures is formed by an electrostatic spinning method.

8. The electrophoretic device according to claim 1, wherein the non-migrating particles have optical reflection characteristics different from optical reflection characteristics of the electrophoretic particles.

9. The electrophoretic device according to claim 1, wherein the non-migrating particles are each formed of one of: an organic pigment, an inorganic pigment, a dye, a carbon material, a metal material, a metal oxide, glass, or a polymer material.

10. The electrophoretic device according to claim 1, wherein the non-migrating particles each comprises titanium oxide.

11. The electrophoretic device according to claim 1, wherein reflectance of the non-migrating particles is higher than reflectance of the electrophoretic particles.

12. The electrophoretic device according to claim 1, wherein about 10% to about 100% of the points of contact between the plurality of superposed fibers are adhered to each other to form the plurality of fibrous structures.

13. A method of manufacturing an electrophoretic device, the method comprising:
- forming a plurality of fibrous structures, wherein each of the plurality of fibrous structures comprises two or more superposed fibers that extend in an identical direction or different directions; and
- forming a porous layer by adding non-migrating particles to the plurality of fibrous structures and dispersing the non-migrating particles in the plurality of fibrous structures,
- wherein the two or more superposed fibers are adhered to each other at one or more points of contact between the two or more superposed fibers to form one of the plurality of fibrous structures.

14. The method of manufacturing the electrophoretic device according to claim 13, wherein each of the plurality of fibrous structures is formed by an electrostatic spinning method.

15. The method of manufacturing the electrophoretic device according to claim 14, wherein the two or more superposed fibers are adhered to each other using a plurality of polymer materials having different surface tension.

16. The method of manufacturing the electrophoretic device according to claim 15, further comprising coating the non-migrating particles with a polymer material having surface tension that is larger than surface tension of a main polymer material of the plurality of fibrous structures before the adding of the non-migrating particles to the plurality of fibrous structures.

17. A display unit comprising:
- an electrophoretic device between a pair of bases, the pair of bases each being provided with an electrode, the electrophoretic device comprising:
  - in an insulating liquid:
    - a plurality of electrophoretic particles; and
    - a porous layer formed of a plurality of fibrous structures, the plurality of fibrous structures comprising a plurality of non-migrating particles,
  - wherein each of the plurality of fibrous structures comprises two or more superposed fibers extending in an identical direction or different directions, and wherein the two or more superposed fibers are adhered to each other at one or more points of contact between the two or more superposed fibers to form one of the plurality of fibrous structures.

18. The display unit according to claim 17, wherein one or both of the pair of bases are light transmissive.

* * * * *